United States Patent Office 3,316,100
Patented Apr. 25, 1967

3,316,100
STERILIZATION OF SPICES BY IN SITU
SALT FORMATION
Murray M. Scharf, Chicago, Ill., assignor to Milani Foods,
Inc., Los Angeles, Calif., a corporation of Illinois
No Drawing. Filed May 12, 1965, Ser. No. 455,327
13 Claims. (Cl. 99—140)

This invention relates to a process for the sterilization of spices and to new products produced therefrom.

Natural spices such as all-spice, ginger, pepper, nutmeg, mace, cinnamon, clove, sage, paprika, and the like, normally harbor large numbers of micro-organisms and spores of micro-organisms, partciularly mould, yeast, and bacteria. The micro-organism population is often as high as 16,000,000 per gram of spice. In dry spices, these micro-organisms usually exist in a dormant state, but when the spices are incorporated into moist food products, the spores may become activated and cause spoilage. Thus, in food processing such as sausage-making it is desirable that the spices be sterilized, that is, that the micro-organism count in the spices be reduced to prevent food spoilage. As used herein, the term "sterilize" refers to the reduction of the micro-organism count to acceptable limits.

One method of sterilizing spices which has been used in the past consists essentially of heat treatment by either dry or moist heat. However, temperatures below about 240° F. have been found to be generally ineffective to kill the micro-organisms, even after prolonged treatment, while at temperatures above about 240° F., the color and flavor of the spices are adversely affected. Although spice color is not always of prime importance in food processing, excessive heat treatment dissipates the essential and volatile oil constituents, thus robbing the spices of their flavoring elements.

In another method of spice sterilization, gases such as ethylene oxide gas are used. Although this method avoids the ill effects of excessive heat, cumbersome equipment and special handling of the gas are required. Furthermore, after the spices are treated, all traces of ethylene oxide or other active gas must be purged by aeration or by passage of a chemically inert gas through the treating chamber. While this method obviates the general destruction of the spice oils caused by heat, some flavor loss generally occurs when the spices are exposed to the purging gas.

The flavor of spices is due to an intimate blending of a great number of different natural compounds, including alcohols, esters, phenols and their derivatives, terpenes, organic acids, sulphur-containing compounds, alkaloids, resins, and other substances not yet definitely identified. A typical spice contains these natural flavoring compounds embedded or encased in a cellular tissue structure of varying degrees of hardness. Before the spice flavors can be released, the protective tissue must be broken. In food processing, it is desirable that the release of spice flavors be rapid. Therefore, the cellular tissue should be softened to expedite the release of the flavoring compound into the food products. At the same time, this tissue should not be rendered so weak as to allow premature release of the flavoring compound.

The use of various salts in food products is universal. Table salt, sodium chloride, is, of course, the most frequently used salt; but others, such as potassium chloride, sodium acetate, sodium phosphate, sodium citrate, and sodium lactate are also used. If the salt and spices can be added in one step, considerable saving in time and effort will result.

Accordingly, it is an object of this invention to provide a new and improved process for sterilizing spices, without damaging the natural oils which impart to each spice its characteristic odor and flavor.

Another object is to provide a new process for softening the outer tissues protecting the natural spice flavoring compounds so that, upon processing, the flavoring compound will be rapidly released, but not dissipated prior to use.

Still another object is to provide new spice compositions in which natural spices are intimately associated with various edible salts, thereby effecting a simplification in the processing of certain food products.

Other objects, aims, and advantages of the invention will be apparent from the following discussion.

This invention comprises the steps of treating various spices or mixtures of spices, with or without additives, with appreciable quantities of relatively concentrated edible acid to form a dampened mass containing an acid-impregnated spice product, and then neutralizing the mass. The resulting product is a spice derivative consisting essentially of the spice in intimate association with the salt formed upon neutralization. This spice derivative is substantially free of living micro-organisms, and the cellular tissue of the spices have been softened, whereby upon processing, more rapid discharge of the spice oils into food products is realized.

The spices which may be used in the practice of the present invention include but are not limited to pepper, ginger, nutmeg, all-spice, clove, sage, thyme, rosemary, cinnamon, paprika, and mace. Virtually any natural spice can be so treated.

Any edible inorganic or organic acid or mixture of acids may be used in the acid treating step. These acids include, but are not limited, to hydrochloric acid, acetic acid, phosphoric acid, citric acid, tartaric acid, and lactic acid. The conentration of acid should be from about 0.1% to about 5%, by weight of the spice treated, although higher concentrations are also effective and may be used.

In carrying out the method of the invention, the spice is first ground and then placed in a mixer of stainless steel or other non-corrodible substance. Acid is added and the resulting mixture is agitated to ensure thorough mixing. The mixing time will depend on several factors including the batch size and the physical form of the spice material. In general mixing a period of about one hour is adequate to guarantee homogeneity of the final mix.

After the contents of the mixer are thoroughly mixed, sufficient edible alkali is slowly added to neutralize the acid. The preferred alkali is sodium hydroxide, but potassium hydroxide or other edible bases such as sodium carbonate, sodium bicarbonate, calcium hydroxide, calcium carbonate, and magnesium carbonate have been substituted in whole or in part with good results. Anhydrous ammonia gas has also been used successfully. The alkali is preferably added in the form of an aqueous solution. The concentration of this solution is not critical, but it has been found that 50% solution is convenient to use. The use of a concentrated alkali solution in this step causes the generation of appreciable heat in the mixer. It is believed that this heat is a factor in effecting sterilization of the spices.

In the products obtained by the process of this invention the spices are intimately associated with edible salts formed in situ within the spices themselves. The exact composition of any given final product will depend upon the spice, the acid and the alkali used in the process. The treatment softens the epidermal tissue of the spice and renders the cell walls more permeable to the spice oils to enhance flavor release characteristics. In addition the product is substantially free of micro-organisms.

The following examples of the method and products hereinabove described are provided for the purpose of illustrating the invention and are not to be construed, in any sense, as limitations thereof.

EXAMPLE I 45 pounds of ground all-spice were placed in a stainless steel mixer, to which 7.5 pints of a solution of 37% hydrochloric acid was added. The product was permitted to mix intimately for one hour. The concentration of hydrochloric acid was about 7.6% by weight of the spice. After the mixing period was complete, 4.8 pints of a 50% solution of sodium hydroxide was added slowly, permitting the neutralization reaction to take place as the mixer dispersed the solution. During the addition of the sodium hydroxide solution, the temperature of the contents of the mixer, which was initially at room temperature, rose to a range of from about 100° F. to about 140° to 150° F., the higher temperatures being associated with more rapid additions of the alkali.

The all-spice that was placed in the mixer had an initial bacteria content of 1,800,000 per gram and a mesophilic spore count of 7,000 per gram. After the treatment as above described was complete, the product was sterile. Neither bacteria nor mesophilic spores could be detected.

EXAMPLE II

Quantities of white pepper having a bacteria count of 1,205,000 per gram and a mesophilic spore count of 12,000 per gram, were treated with varying amounts of hydrochloric acid according to the method described in Example I. The temperature of the resulting acid-treated mixture was 70° F. To each mixture, a sufficient quantity of a 50% solution of sodium hydroxide was added until neutralization was complete. Heat was generated during this neutralization step. The bacteria and mesophilic spore counts were then measured. The results are set forth in Table I:

TABLE I

[White pepper treated with HCl and NaOH]

| Acid Conc. based on weight of spice, percent | Micro-organism Count per gram of spice | | Temperature reached during neutralization |
|---|---|---|---|
| | Bacteria | Mesophilic Spores | |
| Control | 1,205,000 | 102,000 | 70 |
| 0.11 | 190,000 | 24,000 | 71 |
| 0.22 | 210,000 | 3,000 | 73 |
| 0.44 | 92,000 | 8,000 | 75 |
| 0.66 | 82,000 | 1,000 | 79 |
| 1.23 | 3,250 | 3,200 | 96 |
| 2.46 | 560 | 57 | 112 |
| 4.92 | 30 | 9 | 120 |
| 7.60 | 0 | 0 | 140 |

These data indicate that the use of even small amounts of acid, e.g. as low as 0.11% based on the weight of spice, will, upon neutralization, produce a spice with significantly reduced micro-organism count. As the concentration of HCl and NaOH increase, micro-organism count is further reduced until, at around a concentration of 7.6%, there are found, upon neutralization, no bacteria or mesophilic spores. For some purposes, a complete kill of all micro-organisms is not necessary. Thus, the user of this invention can select the proper acid concentration which will reduce the micro-organism count to his acceptable limits.

EXAMPLE III

Quantities of white pepper of Example II were treated according to the method of Example II, except that varying amounts of lactic acid, citric acid, and phosphoric acid were used in place of the hydrochloric acid. The results are set forth in Tables II, III, and IV:

TABLE II

[White pepper treated with lactic acid and NaOH]

| Acid Conc. based on weight of spice, percent | Mesophilic Spore Count per gram of spice | Temperature reached during neutralization, Degrees F. |
|---|---|---|
| Control | 102,000 | 70 |
| 5.6 | 2,970 | 105 |
| 11.3 | 244 | 109 |
| 16.9 | 960 | 118 |
| 21.5 | 360 | 123 |

TABLE III

[White pepper treated with $H_3PO_4$ and NaOH]

| Acid Conc. based on weight of spice, percent | Mesophilic Spore Count per gram of spice | Temperature reached during neutralization, Degrees F. |
|---|---|---|
| Control | 102,000 | 70 |
| 7.9 | 0 | 115 |
| 15.8 | 0 | 120 |
| 23.7 | 0 | 125 |
| 31.6 | 0 | 134 |

TABLE IV

[White pepper treated with citric acid and NaOH]

| Acid Conc. based on weight of spice, percent | Mesophilic Spore Count per gram of spice | Temperature reached during neutralization, Degrees F. |
|---|---|---|
| Control | 102,000 | 70 |
| 3.4 | 73 | 111 |
| 6.7 | 63 | 120 |
| 10.1 | 290 | 125 |
| 13.4 | 118 | 130 |

These data show the effectiveness of organic acids and other inorganic acids when employed in the practice of this invention. Although acids and bases in somewhat greater concentration can be used, concentrations of lactic acid, phosphoric acid, and citric acid as low as 5.6, 7.9 and 3.4, respectively are sufficient to achieve, upon neutralization, a significant reduction in mesophilic spore count. A complete kill of mesophilic spores was achieved when the phosphoric acid was as low as 7.9%.

Use of the organic acids did not result in a complete kill of the mesophilic spores, but their number was significantly reduced, to a value well within acceptable limits for many purposes. Along with the significant lowering of mesophilic spore count, the bacteria count was likewise lowered.

EXAMPLE IV

Ginger having a bacteria count of 14,000,000 per gram was treated with 2.7% of hydrochloric acid, based on the weight of the ginger, according to the method of Example II. After being so treated the bacteria count of the ginger was reduced to 9800 per gram. This marked decrease in bacteria count illustrates the usefulness of this invention in reducing the high bacteria population found in ginger.

EXAMPLE V

Quantities of all-spice having a bacteria count of 1,900,000 were treated according to the method of Example II. The results are set forth in Table V.

TABLE V
[All-spice treated with HCl and NaOH]

| Acid conc. based on weight of spice, percent: | Bacterial count [1] |
|---|---|
| Control | 1,900,000 |
| 0.45 | 910,000 |
| 2.7 | 100 |

[1] Per gram of spice.

These data illustrate the usefulness of this invention in reducing the bacteria count in natural all-spice. The use of at little as 2.7% acid will, upon neutralization, yield a product was substantially negligible bacteria count.

EXAMPLE VI

A sample of the white pepper derivative obtained as the product of the method described in Example II using 7.6% acid (treated spice) was compared with the ordinary white pepper used therein (untreated spice). One gram of each was mixed with 200 cc. of water, and the resulting mixture tested for flavor and appearance. The results are tabulated in Table VI.

TABLE VI
[Properties of treated and untreated white pepper]

| Sample | Flavor | Supernatant Liquor | Outer Tissues of Spice | Spice Color |
|---|---|---|---|---|
| Untreated | Acrid | Cloudy | Hard | Normal. |
| Treated | No acridity | Clear | Softened | Darkened. |

Similar results were obtained with caraway and all-spice; it appears that treatment by the method of this invention destroys the acridly bitter principle in spices, and causes a general softening of the outer tissues which permits quicker exit of the spice flavoring oils when the spices are mixed in food products. The clear liquor obtained from the treated spices when the solids have settled is believed due to hydrolysis of the starch which is present in spices in amounts of about 3% to 38% by weight.

From the foregoing, it can be seen that a new product has been produced, which is a spice derivative containing the spice in intimate association with the salt formed upon neutralization, and harboring few or no micro-organisms.

I claim:

1. The method of treating natural spices comprising the steps of:
    mixing ground spices with an edible acid to provide a substantially uniform acid-impregnated mass of spice particles;
    adding an edible alkali to the said mass to neutralize said acid in situ within said mass, thereby reducing the micro-organism population normally present in said spices and softening the cellular structure of said spice particles.

2. The method according to claim 1 in which the acid is hydrochloric acid.

3. The method according to claim 1 in which the acid is hydrochloric acid and in which the said hydrochloric acid is present in a concentration of from about 0.1 to about 8 percent by weight of the ground spices.

4. The method according to claim 1 in which the acid is an aqueous solution of phosphoric acid.

5. The method according to claim 1 in which the acid is an aqueous solution of citric acid.

6. The method according to claim 1 in which the acid is an aqueous solution of lactic acid.

7. The method according to claim 1 in which the alkali is selected from the group consisting of sodium hydroxide, sodium carbonate, sodium bicarbonate, potassium hydroxide, calcium hydroxide, calcium carbonate, magnesium carbonate, ammonia, and mixtures thereof.

8. The method according to claim 1 in which the alkali is an aqueous solution of sodium hydroxide.

9. The method according to claim 1 in which the alkali is added in an amount substantially stoichiometric with the acid used.

10. The method according to claim 1 in which the acid is selected from the group consisting of phosphoric acid, citric acid and lactic acid and in which the said acid is present in a concentration of about 3 percent by weight of the ground spices.

11. The method of preparing a sterile spice product comprising the steps of:
    treating a particulate spice material with an aqueous acid solution containing from about 0.1 to about 8 percent by weight of hydrochloric acid, based on the weight of said spice material, to provide a substantially uniformly acidified spice composition;
    and adding to said acidified spice composition an aqueous solution containing sodium hydroxide in an amount sufficient to neutralize free acid contained in said acidified spice composition; thereby destroying micro-organisms present in said spice material and forming a depository salt within said spice material to provide a stabilized spice of improved shelf-life and enhanced flavor-release properties.

12. The method according to claim 11 in which sodium hydroxide solution is added to the acidified spice composition at a rate sufficient to generate heat of neutralization within the particulate spice material to elevate the temperature thereof up to a level in the range of between about 100 to about 150° F.

13. The method according to claim 11 in which the sodium hydroxide solution is added in an amount substantially stoichiometric with free acid contained in said acidified spice composition.

No references cited.

A. LOUIS MONACELL, *Primary Examiner.*

H. H. KLARE, *Assistant Examiner.*